June 2, 1964 F. S. SALTER 3,135,142
VARIABLE SPEED DRIVE FOR MOVING MASSES
Filed July 6, 1961 2 Sheets-Sheet 1

INVENTOR
FRANK SIDNEY SALTER
BY
ATTORNEY

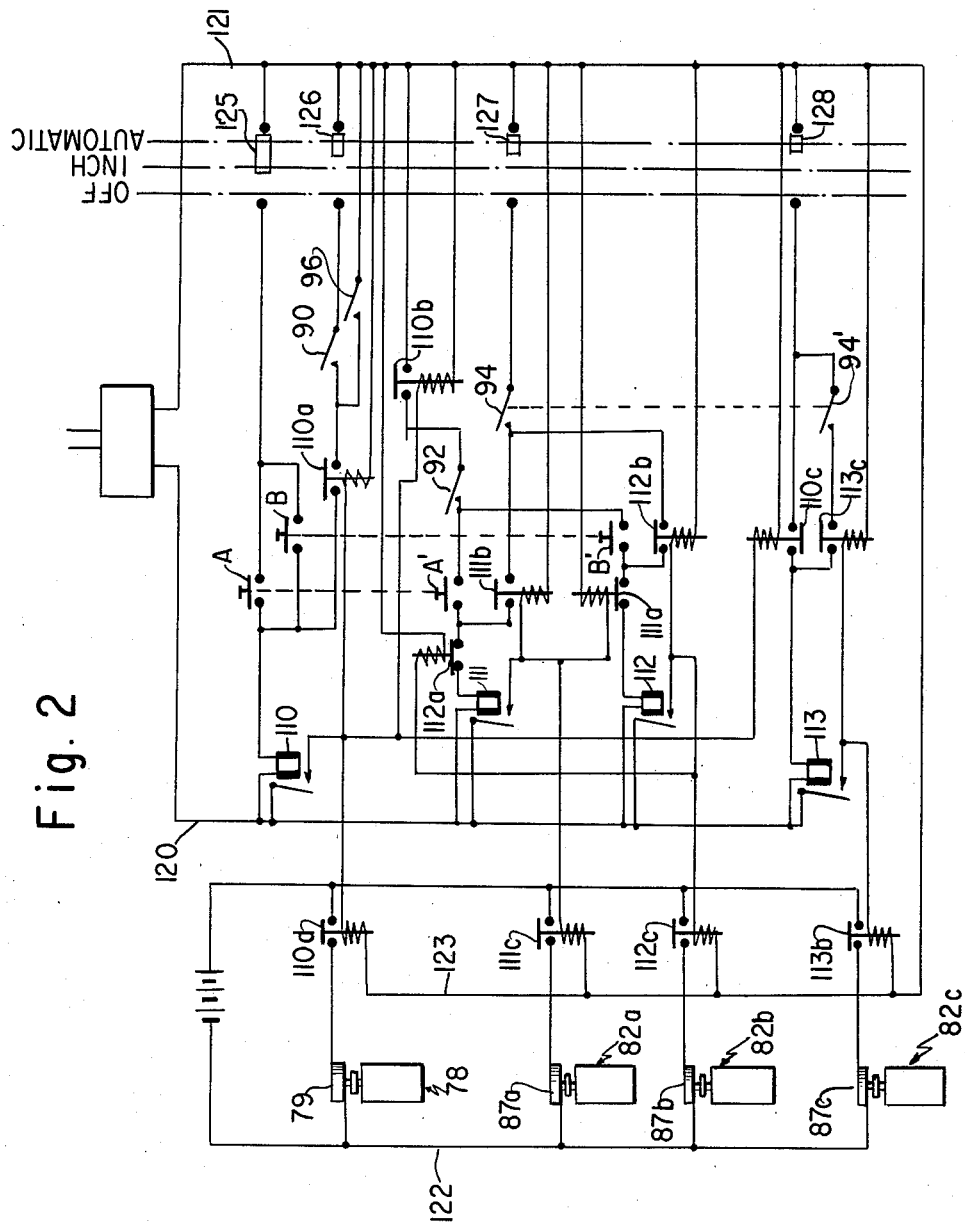

United States Patent Office 3,135,142
Patented June 2, 1964

3,135,142
VARIABLE SPEED DRIVE FOR MOVING MASSES
Frank Sidney Salter, Parkstone, Dorset, England, assignor to The Loewy Engineering Company Limited, Bournemouth, England, a corporation of Great Britain
Filed July 6, 1961, Ser. No. 122,322
3 Claims. (Cl. 78—96)

Presses are often equipped with facilities in the form of movable carriers for providing supports or holders for at least two tools which can be brought successively into operation by a rotary or translatory movement of the carrier. The arrangement of the tools on the carrier with respect to the press is such that one of them is at an inside or working station in which this tool is in alignment with another tool of the press, while at the same time the second tool on the carrier is in an outside or parking station in which it can be inspected, re-conditioned, if necessary, or replaced. Similar arrangements are sometimes made in presses in respect of workpieces instead of tools, in which case the carrier has at least two supports or holders for workpieces.

Translatory or rotary carriers of the type described are, for instance, incorporated into forging presses, manipulators for forging presses, or into metal extrusion presses where they can support a plurality of either die-holders or billet containers.

In all these cases, it is essential that the tools on the carriers are moved as quickly as possible from one station to the other, in order to shorten the time during which the press must remain idle. Another requirement is that the carriers are stopped in such a way that the tool (or workpiece) is in accurate alignment with the other tool with which it has to co-operate, and this stoppage must be effected without any sharp impact on the carrier.

These requirements are not easy to reconcile with each other, particularly in the case of large presses in which the carriers and parts supported by them are heavy, having a weight of several tons. It then becomes necessary to control not only the maximum speed at which the carrier moves, but also the increase and decrease of speed during the periods of acceleration and deceleration respectively, especially the latter. Known arrangements have not been entirely satisfactory in this respect, and, in particular, it was not possible with them to take sufficiently into account any change in the moving masses of the carriers which occurred when a set of tools was exchanged for one of different size.

According to the invention there is provided a press having a movable carrier adapted to support at least two tools or workpieces and drive means operable to move the carrier to effect successive movement of tools or workpieces carried by the carrier from an outside or parking station into an inside or working station and vice versa, wherein the speed of said drive means is continuously variable and the rate of acceleration and deceleration of the carrier is controlled by speed control means adapted to regulate the change in speed of the drive means, said speed control means including a cam and a follower movable relative to the cam along a track thereof in response to movement of the carrier, the development of the cam track engaged by the follower during acceleration or deceleration of the carrier representing the speed characteristic of the carrier plotted over the distance traversed by the carrier during such acceleration or deceleration. The speed of the carrier throughout its movement may thus be closely controlled in such a manner that the movement takes place in the shortest possible time, though without any sharp impact on the carrier when it comes to rest.

One embodiment of the invention will now be described, by way of example, with reference to the accompanying drawings, in which:

FIG. 2 is a diagram of the electric circuits of the arrangement of FIG. 1.

Figure 1:
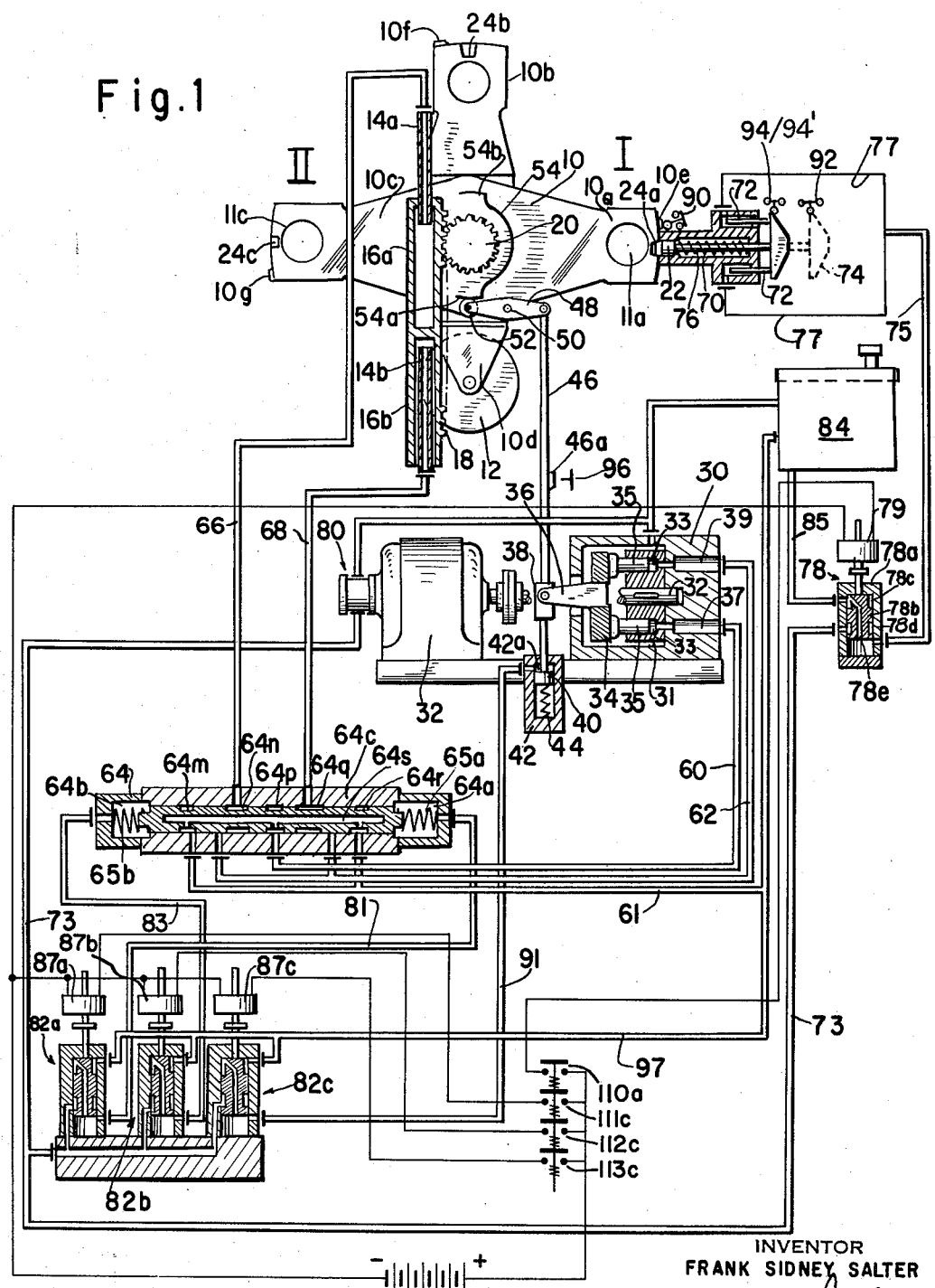
FIG. 1 shows a diagrammatic arrangement of a continuously variable speed drive applied to a rotary die-holder carrier of a press.

A known form of press comprises, a billet container, a pressing stem which, under hydraulic power, is entered into the bore of the container, and a die at the end of the container which shapes a metal billet placed in the container and subjected to compression by the pressing stem. The die is mounted in a die-holder and can be taken out from its mounting for exchange against another die. These parts are of any suitable or conventional design, and not shown in the drawing.

The only part of the press shown in FIG. 1 is a rotatable die-holder carrier 10 arranged between container and platen of the press. The carrier mounts two die-holders 11a and 11c which, together with their dies, can be alternately positioned at an inside or working station I and at an outside or parking station II respectively. Hence, one of the dies, the one at station II, can be inspected, reconditioned or exchanged, whilst a billet is extruded through the other die, the one at station I. In the embodiment shown, the two die-holders 11a and 11c are arranged diametrically opposite each other so that, by rotating the carrier 10 by 180°, the two die-holders exchange their positions.

The die-holder carrier 10 is shown here as being of cruciform shape and has, accordingly, four arms 10a, 10b, 10c and 10d. Two of these arms which are diametrically opposite each other—10a and 10c—are provided near their ends with circular holes for the accommodation therein of the die-holders 11a and 11c. In the position shown in FIG. 1, the die-holder 11a is assumed to be in the axis of the container of the press, i.e. at the working station I, whilst the die-holder 11c is assumed to be at the outside or the parking station II. A third arm, 10b, intermediate the two arms 10a and 10c, has an opening near its end for the accommodation therein of a suitable tool, not shown, for the ejection from the container of any billets which, for one reason or another, for instance, insufficient temperature, cannot be shaped. The fourth arm, 10d, carries a counterweight 12. If desired, the counterweight can be replaced by another implement or tool.

The carrier 10 is rotatable about its center by a hydraulic motor which comprises two stationary rams 14a and 14b and two cylinders 16a and 16b respectively, which are displaceable longitudinally with respect to the two rams. The cylinders are joined together at their closed ends and operate a longitudinally extending rack 18 which meshes with a pinion 20 on the die-holder carrier 10. Displacement of the cylinders 16a and 16b over the rams 14a and 14b respectively results in rotation of the carrier 10 in the clockwise or counter-clockwise direction.

A locking pin 22 is provided which can be entered into one of three recesses 24a, 24b or 24c provided at the ends of the arms 10a, 10b and 10c respectively. The pin 22 can be advanced or retracted radially with respect to the carrier 10 by means to be presently described. The pin 22 serves the purpose of retaining the carrier 10 in the position in which the opening in one of its arms, as well as the tool mounted in that arm, are in exact alignment with the container bore.

The length of the rack 18 is at least such that the pinion 20, and thereby also the carrier 10, are rotated by 180° during one stroke of the cylinders 16a or 16b. In the position shown in FIG. 1, the die-holder 11a is at station I, so that after shaping of a billet by the die of this die-holder, rotation of the carrier 10 by 180° is required to move this die-holder to station II, where it can be inspected or exchanged. By the same movement, the die-holder 11c is caused to travel from station II to station I, where the die-holder is in axial alignment with the container bore and thus ready to be used for the next cycle. A pressing operation can now proceed as usual with the die in the die-holder 11c. Thereafter, the carrier 10 is again rotated by 180°, this time in the opposite direction, whereby the arms 10a and 10c, as well as the die-holders 11a and 11c, exchange their positions again with respect to the stations I and II. In the next cycle, the die-holder 11a is at station I and the die-holder 11c is at station II. This exchange of positions is repeated for any number of cycles and so long as the press is in operation, with the carrier 10 being rotated by 180° in opposite directions between two alternate cycles. Should at any time a billet be too cold, or develop any other defects which make it impossible for it to be shaped, then the billet ejection tool in the arm 10b is placed into position at station I by rotating the carrier 10 by 90° only, either in the clockwise or counterclockwise direction, as the case may be.

It is nowadays required that the number of pressing operations per hour with a press be as great as possible. This makes it necessary to shorten the time between successive pressing operations required for auxiliary movements, such as rotation of the carrier 10. A high speed of rotation is therefore desirable. On the other hand, it is essential that the carrier is brought to a standstill in an exact angular position, and this very smoothly, in order to avoid any detrimental shocks, especially in the gear drive between the hydraulic motor and the carrier. These conditions are fulfilled by the speed control means for the hydraulic drive of the carrier, which will now be described.

The hydraulic drive for the carrier 10 comprises a high pressure oil pump 30, driven at constant speed by an electric motor 29. The pump shown in the example is of the swash-plate type and comprises a barrel 31 mounted on a driving shaft 32 for rotation therewith, the barrel 31 being formed with a plurality of cylinders 33 distributed around the driving shaft 32, a swashplate 34 mounted on trunnions (not shown) on the casing of the pump, a control lever 36 connected to the swashplate 34, and pistons 35 mounted in the cylinders 33 and in endwise engagement with the swashplate. The pump casing is formed with an outlet port 37 which communicates through a semi-annular opening in the pump casing with the cylinders on one side of the axial plane of symmetry between the swashplate trunnions, and an inlet port 39 which communicates through a semi-annular opening with the cylinders on the other side of the axial plane of symmetry. Rocking movement of the lever 36 alters the angle of tilt of the swashplate and thereby the rate of liquid drawn into the cylinders during their movement past the semi-annular opening communicating with the port 39, upon rotation of the driving shaft, and also alters by an equal amount the rate of liquid discharged from the cylinders during their movement past the semi-annular opening communicating with the port 37. The rate of delivery and the rate of acceptance of liquid by the pump is thus continuously variable under the control of the lever 36. The pump has only been shown diagrammatically in the drawing, and may be of any known, suitable construction. Instead of a swashplate pump, other types of high-pressure pumps may be used whose output can be varied during its running by a movable control element.

The end of the lever 36 is hinged to a block 38 which is connected to a piston 40 displaceable in a hydraulic cylinder 42 against the action of a spring 44. A chamber 42a, at one side of the piston 40, can be filled with liquid under pressure. The block 38 is connected through a rod 46 to a lever 48 pivoted at 50 on a fixed bracket (not shown) and carrying at its opposite end a cam roller 52. The latter is adapted to engage a rotary cam disc 54 mounted on the carrier 10 co-axial with the pinion 20. Normally, the roller 52 and the cam disc 54 are not in engagement with each other, as the spring 44 tends to rock lever 48 counter-clockwise about pivot 50 and the lever 36 holds the swashplate at a very small angle of tilt. By admitting liquid under pressure to the chamber 42a the force of the spring 44 is overcome and the roller 52 is held in contact with the cam disc 54.

During operation of the hydraulic drive for the carrier 10, the outlet and inlet ports 37, 39 of the pump 30 are connected in a closed hydraulic circuit with the cylinders 16a and 16b through lines 60, 62, a directional control valve 64, and lines 66, 68.

It will be apparent from the foregoing that the shape of the cam 54 governs the movement of the block 38, and thereby that of the lever 36, which determines the angle of tilt of swashplate 34. The contour of the cam disc 54 controls thus the rate of delivery and acceptance of liquid by the pump 30, and thereby also the speed at which liquid is displaced in the cylinders 16a and 16b. To every angular position of the cam disc 54, there belongs, therefore, a predetermined angle of tilt of the speed control member—the swashplate 34—of the pump. The contour of the cam surface controls the speed of the carrier 10. It is thus possible to impart to the carrier 10 any desired pattern of speed during its rotary movement by giving a suitable shape to the contour of the cam 54. This can be done by plotting a curve of desired speeds over angles of carrier rotation and treating this curve as a development of the cam surface.

The surface of the cam disc 54 is formed at parts of its circumference which are diametrically opposite each other, with radial projections 54a and 54b. These, when contacted by the roller 52, depress the latter and thereby lift the rod 46 and decrease the angle of tilt of the swashplate 34. The output of the pump 30 and the speed of the carrier 10 will then be reduced.

The contour of the cam 54, and in particular that of the flanks of the projections 54a and 54b, are so shaped that the carrier 10, when approaching during its rotation one of the stations I and II, is slowed down at such a rate that the carrier comes to rest without any undue shock. The periods of deceleration and slow speed rotation of the carrier 10 are made as brief as compatible with safe movement of the carrier, in order to shorten the time required for a rotation of the carrier 10 between the two stations I and II.

As mentioned before, the carrier 10 can be held in a predetermined angular position by means of the locking pin 22. The latter is normally urged into engagement with one of the recesses 24a, 24b, or 24c by a spring 70, but can be withdrawn by means of twin hydraulic cylinder-and-ram units 72 which both act on a crosshead 74 connected by a rod 76 to the pin 22. A small vane-type pump 80 driven by the motor 32 feeds liquid through line 73 to a valve 78 which is operated by a solenoid 79 and which controls supply and discharge of liquid through lines 75, 77 to the cylinder and ram units 72.

The valve 78 comprises a cylindrical housing 78a and a valve element 78b formed with an annular port 78c at one end of the element 78b, an annular port 78d spaced from the other end of the element 78b, and a central duct 78e communicating with port 78c. The valve element 78b is urged by a spring (not shown) into the closed position shown in FIG. 1 in which the line 73 opens into the port 78d and the line 75 communicates via duct 78e and port 78c with a discharge line 85. Upon energization of solenoid 79 the valve element 78b is moved downwards from the position shown in FIG. 1 to an open position in which the annular port 78d overlaps the inlet from line 73 and the outlet leading to line 75, whereby liquid supplied through line 73 is fed to line 75.

The control means for the hydraulic motor will not be described in greater detail.

The pump 30, the directional valve 64 and cylinders 16a and 16b form part of a primary hydraulic circuit, which also includes the lines 60, 62, 66 and 68. In addition, a secondary or auxiliary hydraulic circuit is provided which includes the small vane-type pump 80 as well as a group of three control valves 82a, 82b, 82c, operated by electric solenoids 87a, 87b, 87c respectively. A reservoir 84 for the hydraulic fluid circulating in the primary and secondary circuits receives liquid by-passed through the valve 64 and liquid exhausted from the control valves 82a, 82b, 82c, 78, and serves also to fill the pump 30 and feed the pump 80.

The directional valve 64 comprises a casing formed with two chambers 64a, 64b at opposite ends thereof and a ported valve element 64c having its ends projecting into chambers 64a, 64b. The valve element 64c is formed with annular ports 64m, 64n, 64p, 64q, 64r, and a central duct 64s which communicates with ports 64m, 64p, 64r. Two valve springs 65a, 65b in the chambers 64a, 64b urge the valve element 64c into a central neutral position in which the line 60 from the outlet port 37 of the pump 30 is connected through port 64p, duct 64s and ports 64m, 64r in the valve element 64c to a line 61 leading to the reservoir 84. The valve 82a controls supply and discharge of liquid through line 81 to chamber 64a and the valve 82b controls supply and discharge of liquid through line 83 to chamber 64b. The valves 82a, 82b, 82c are similar in construction to the valve 78 which has been described above. In the positions shown in FIG. 1, all valves are connected through exhaust line 97 to reservoir 84. Supply of liquid under pressure through valve 82a to chamber 64a displaces the valve element 64c to the left and the ports 64q in the valve element connects the line 68 communicating with cylinder 16b to the line 60 leading from the outlet port 37 of motor 32 and the port 64n connects the line 66 communicating with cylinder 16a to the line 62 leading to the inlet port 39 of motor 32. Supply of liquid under pressure through valve 82b to chamber 64b displaces the valve element 64c to the right and the port 64n connects the line 66 communicating with cylinder 16a to the line 60 and the port 64q connects the line 68 communicating with cylinder 16b to the line 62. Thus, upon operation of valve 82a, liquid under pressure is supplied to cylinder 16b and exhausted from cylinder 16a, whereby the carrier rotates in a clockwise direction, whilst, conversely, operation of the valve 82b results in the supply of liquid under pressure to the cylinder 16a and exhaust thereof from the cylinder 16b, causing the carrier 10 to rotate in a counter-clockwise direction. The valve 82c controls supply and discharge of liquid through line 91 to chamber 42a. In order to make speed control of carrier 10 by cam 54 effective, the solenoid 87c is energized to open valve 82c, whereby liquid under pressure is admitted to chamber 42a and the rod 46 shifted in a direction which moves the cam roller 52 into engagement with cam 54.

Arranged in the path of the arms 10a, 10b and 10c of the carrier 10 is an electric limit switch 90 which is in the circuit of a contactor 110 (FIG. 2) operating the solenoid 79 of the valve 78. This limit switch is engageable by small cams 10e, 10f and 10g arranged each on one of the three aforementioned arms. Arranged at the outer end of the stroke of the crosshead 74 is an outer limit switch 92 and at the inner end of that stroke, an inner limit switch 94, both limit switches being in circuit with contactors 111, 112 operating the solenoids 87a, 87b of the two valves 82a and 82b respectively. A duplicate limit switch 94' is in circuit with a contactor 113 operating the solenoid 87c of valve 82c. The limit switches 92, 94/94' are so designed that limit switch 92 is closed and limit switch 94/94' opened upon contact by crosshead 74. A limit switch 96 is adapted to be actuated by a cam face 46a on rod 46 at the end of a rotation of the carrier 10 by which the arms 10a and 10c exchange their position relative to the stations I and II, the limit switch 96 being connected in parallel with limit switch 90. The operation of the valve solenoids by the limit switches will presently be described. Referring to FIG. 2, the contactors 110, 111, 112, 113 are connected across alternating current mains 120, 121 and the solenoids 79, 87a, 87b, 87c are connected across direct current mains 122, 123. A push button switch A, A' for initiating clockwise rotation of the carrier 10 is connected in the lines through contactors 110, 111, and a push button switch B, B' for initiating counter-clockwise rotation of the carrier 10 is connected in the lines through contactors 110, 112, the switches A, B in the line through contactor 110 being in parallel. The contactor 110 operates contacts 110a, 110b, 110c, 110d, the contact 110a being in parallel with switches A, B on the line through contactor 110, the contact 110b being in the line through switch A' and the contactor 111 and in the line through switch B' and contactor 112, the contact 110c being in the line through contactor 113, and the contact 110d being in the line through solenoid 79. The contactor 111 operates contacts 111a, 111b, 111c, the contact 111a being in series with contactor 112, the contact 111b being in the line through contactor 111 and in parallel with switch A', and the contact 111c being in the line through solenoid 87a. The contactor 112 operates contacts 112a, 112b, 112c, the contact 112a being in series with contactor 111, the contact 112b being in the line through contactor 112 and in parallel with switch B', and the contact 112c being in the line through solenoid 87b. The contactor 113 operates contacts 113a, 113b, the contact 113a being in the line through contactor 113 and in parallel with contact 110c, and the contact 113b being in the line through solenoid 87c. The switches 90, 96 are connected in parallel in the line through contact 110a, the switch 92 is in series with contact 110b, the switch 94 is in series with contacts 111b, 112b, and the switch 94' is in series with contact 113a and in parallel with contact 110c. A rotary controller (not shown) operates switches 125, 126, 127, 128, the switch 125 being in the line through switches A, B, the switch 126 being in the line through switch 96, the switch 127 being in the line through switch 94, and the switch 128 being in the line through contacts 110c, 113a. The controller is movable by hand into an "Off" position in which all the switches 125, 126, 127, 128 are open, an "Automatic" position in which all the switches 125, 126, 127, 128 are closed, and an "Inch" position in which only switch 125 is closed and switches 126, 127, 128 are open.

Before the starting of a drive operation, the carrier 10 is locked by pin 22 in a position in which arm 10a or 10c is in station I or II; the switches A, A', B, B', 90, 92, 94, 94', 96 are then open and all the contacts, except 111a, 112a, are also open. Motor 32 may be running, pump 30 is however idling as the valves 82a and 82b are both on "exhaust."

The sequence of operations of the switches, contacts and valves of the drive means will now be described. In the following it is assumed that the arm 10a is at station I and the arm 10c at station II, as shown in FIG. 1, and that the carrier 10 has to be rotated in a clockwise direction.

The controller is first moved into the "Automatic" position in which switches 125, 126, 127, 128 are closed, and push-button switch A, A' is then closed. Closure of switch A, A' energizes contactor 110 which closes contacts 110a, 110b, 110c, 110d. The line through 110a remains open since the switches 90, 96 are open, and the line through 110b remains open since the switch 92 is open. The line through 110c is closed and energizes contactor 113, and the line through 110d is closed and energizes solenoid 79. Energization of contactor 113 closes switch 113a, 113b. The line through 113b is then closed and energizes solenoid 87c which opens valve 82c and supplies liquid under pressure to chamber 42a, thereby bringing roller 52 into contact with the cam 54.

Energization of solenoid 79 opens valve 78 which results in the admission of liquid under pressure to the ram and cylinder units 72, whereby the pin 22 is withdrawn from the recess 24a and the carrier is free to rotate. At the start of its stroke the crosshead 74 is disengaged from switch 94, 94' thereby permitting the latter to close, and at the end of its stroke the crosshead 74 engages outer limit switch 92 and closes the latter. This closes first the line through contact 113a and then the line through contact 110b, energizing contactor 111 (switch A' being closed).

Energization of contactor 111 opens interlocking contact 11a and closes contacts 111b, 111c. The line through 111a is thus held open, thereby preventing inadvertent energization of contactor 112. The line through 111b is closed since switch 94 is closed, and the line through 111c is closed and energizes solenoid 87a.

Energization of solenoid 87a opens valve 82a which, as explained above, results in liquid being fed into cylinder 16b and exhausted from cylinder 16a; the carrier 10 starts to move in a clockwise direction.

Initial movement of the carrier disengages cam 10e from the switch 90, permitting the latter to close. The line through switch 90 and contact 110a is then closed and push-button switch A, A' may be released since contactor 110 is held energized through contact 110a, switch 90, and contactor 111 is held energized through contact 111b, switch 94. Upon further movement of the carrier the roller 52 rides off the cam projection 54a and the cam 46a on rod 46 is disengaged from switch 96, permitting the latter to close. The speed of the rotary motion of the carrier 10 is then controlled by the cam 54 in the manner described above.

Upon movement of the arm 10b past station I, the cam 10f engages switch 90 and opens the latter, but contactor 110 is held energized by the line through switch 96. Upon movement of the arm 10b beyond station I the cam 10f is disengaged from switch 90 permitting it to close again.

Upon the approach of arm 10c to station I, the cam projection 54b is engaged by the roller 52, moving the latter outward and raising the rod 46 to engage the cam 46a with switch 96, thereby opening the latter. Contactor 110 is however still held energized by the line through switch 90. Upon engagement of the cam 10g with switch 90, the latter is opened and thereby de-energizes contactor 110 which in turn results in contacts 110a, 110b, 110c, 110d being opened. Although switch 110c is open, contactor 113 is still held energized through line 113a and switch 94' so that the carrier continues to be driven at a speed regulated by the cam 54. The opening of switch 110d de-energizes solenoid 79 and thereby permits the liquid in the ram and cylinder units 72 to exhaust through valve 78. The pin 22 is then moved into engagement with the recess 24c, under the influence of spring 70, and the crosshead 74 opens switch 94, 94' and switch 92. The opening of switch 94' de-energizes contactor 113 which in turn opens contact 113b and de-energizes solenoid 87c, thereby releasing liquid from chamber 42a. The opening of switch 94 de-energizes contactor 111 which in turn opens contact 111c thereby de-energizing solenoid 87a and interrupting the supply of liquid to the hydraulic drive of the carrier. The valve element 64c then returns to its neutral position in the centre of the valve casing under the action of two oppositely acting springs 65a, 65b, and liquid fed to the valve 64 by pump 30 is returned to reservoir 84.

The die holder 11c is now at station I, i.e. in axial alignment with the container of the press, whilst die holder 11a is at station II, and the press is ready for another cycle. After this second cycle has been completed, the carrier 10 is again rotated, this time in a counter-clockwise direction, by closing push-button switch B, B', the sequence of operation of the switches and contacts being as described above for clockwise rotation, with the difference that contactor 112 and solenoid 87b are energized instead of contactor 111 and solenoid 87a. The die holder 11a is then moved back to station I and the die holder 11c to station II.

If it is desired to move the carrier 10 by small increments or to move the carrier to a position in which the billet contacting tool on arm 10b is in axial alignment with the press container, the controller is moved to the "inch" position in which the switch 125 is closed and switches 126, 127, 128 are open. Closure of switch A, A', for clockwise rotation, energizes relay 110, which results in retraction of the locking pin 22 and supply of liquid under pressure to the cylinder 16b as already described in connection with the automatic operation of the carrier. Since the switch 128 is open, the contactor 113 and the solenoid 87c remain de-energized whereby the roller 52 is held out of engagement with the cam 54 and the switch 96 is held open by cam 46a. The swashplate 34 has then only a very small angle of tilt and the output from pump 30 and hence the speed of the carrier is reduced to a minimum. The carrier will continue to rotate while the switch A, A' is held closed, but will cease to rotate immediately when switch A, A' is released since contactor 111 is energized only by the line through switch A'.

The invention is capable of other embodiments than the one described here by way of example. Changes may be made, for instance, in the type of pump or in the hydraulic motor for the carrier.

The invention can be employed for the control of the movement of other parts of a press than the die-holder carrier, for instance, for the movement control of a carrier supporting a number of billet containers which are successively moved in and out of axial alignment with the pressing stem of the press.

The invention can also be used for the movement control of parts having a translatory instead of rotary movement, and it can be applied to machines and presses other than that of the kind particularly described, for instance, to the movement control of multi-station work-tables of vertical presses or to that of manipulators for forging presses.

I claim:

1. In a press, an angularly movable carrier adapted to support a tool or workpiece, hydraulic drive means operable to move the carrier to effect movement of a tool or workpiece carried by the carrier between a parking station and a working station, wherein said carrier comes to a complete stop after each movement and control means for regulating the acceleration and deceleration of the carrier, said hydraulic drive means comprising a variable displacement hydraulic pump, a hydraulic motor having two opposing cylinders and a driven member movable in opposite directions upon supply of a liquid under pressure to different cylinders, said driven member being drivably connected to the carrier, conduit means connecting the pump and motor in a closed hydraulic circuit in which the outlet of the pump is connected to one of the motor cylinders and the inlet of the pump is connected to the other of the motor cylinders, and valve means operable to reverse the hydraulic connections between the pump and the motor cylinders, and said control means include a cam adapted to be angularly movable with said carrier, said cam having a track thereon representing the desired acceleration and deceleration of the carrier, a follower movable relative to the cam along the track thereof in response to movement of the carrier, and means regulating the displacement of the pump, and hence the acceleration and deceleration of the carrier, in accordance with the movement of the follower under the influence of the cam.

2. In a press, an angularly movable carrier adapted to support a tool or workpiece, hydraulic drive means operable to move the carrier to effect movement of a tool or workpiece carrier by the carrier between a parking station and a working station, wherein said carrier comes to a complete stop after each movement and control means regulating the acceleration and deceleration of the carrier, said hydraulic drive means comprising a swashplate hydraulic pump, the displacement of said pump being regulable by adjustment of the angle of tilt of the swashplate, a hydraulic motor having two opposing cylinders and a driven member movable in opposite directions upon supply of liquid under pressure to the different cylinders, said driven member being drivably connected to the carrier, conduit means connecting the pump and motor in a closed hydraulic circuit in which the outlet of the pump is connected to one of the motor cylinders and the inlet of the pump is connected to the other of the motor cylinders, and valve means operable to reverse the hydraulic connections between the pump and the motor cylinders, and said control means include a cam connected to the carrier for movement therewith, adapted to be angularly movable with said carrier, said cam having a track thereon representing the desired acceleration and deceleration of the carrier, a follower arranged to engage the cam track, and means regulating the angle of tilt of the swashplate, and hence the acceleration and deceleration of the carrier, in accordance with the movement of the follower under the influence of the cam.

3. In a press, an angularly movable carrier adapted to support a tool or workpiece, hydraulic drive means operable to reciprocate the carrier to effect movement of a tool or workpiece carried by the carrier between a parking station and a working station, wherein said carrier comes to a complete stop after each movement and control means for regulating the acceleration and deceleration of the carrier, said hydraulic drive means comprising a swashplate hydraulic pump, the displacement of said pump being regulable by adjustment of the angle of tilt of the swashplate, a hydraulic motor having two opposing cylinders and a driven member movable in opposite directions upon supply of liquid under pressure to the different cylinders, rack and pinion means drivably connecting the driven member and carrier, conduit means connecting the pump and motor in a closed hydraulic circuit in which the outlet of the pump is connected to one of the motor cylinders and the inlet of the pump is connected to the other of the motor cylinders, and valve means operable to reverse the hydraulic connections between the pump and the motor cylinders, and said control means include a cam mounted on the carrier, adapted to be angularly movable with said carrier, said cam having a track thereon, a follower arranged to engage the cam track, and a linkage system arranged to tilt the swashplate in response to movement of the follower under the influence of the cam, the development of the cam track engaged by the follower during acceleration and deceleration of the carrier during movement between the two stations representing the speed characteristic of the carrier plotted over the distance traversed by the carrier during such acceleration and deceleration.

References Cited in the file of this patent

UNITED STATES PATENTS

| | | |
|---|---|---|
| 2,192,778 | Stacy | Mar. 5, 1940 |
| 2,258,886 | Ernst | Oct. 14, 1941 |
| 2,382,041 | Ernst | Aug. 14, 1945 |
| 2,453,600 | Soden | Nov. 9, 1948 |
| 2,672,773 | Schofield | Mar. 23, 1954 |
| 2,817,991 | Richet | Dec. 31, 1957 |
| 2,838,908 | Forster | June 17, 1958 |